(12) United States Patent
Lee et al.

(10) Patent No.: US 11,962,237 B2
(45) Date of Patent: Apr. 16, 2024

(54) CHARGING DEVICE

(71) Applicants: HYUNDAI MOTOR COMPANY, Seoul (KR); Kia Corporation, Seoul (KR)

(72) Inventors: Jihan Lee, Hwaseong-si (KR); Youngjin Kim, Incheon (KR); Jung Hong Joo, Suwon-si (KR); Jongpil Kim, Yongin-si (KR); Byunggu Kang, Daegu (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 163 days.

(21) Appl. No.: 17/514,271

(22) Filed: Oct. 29, 2021

(65) Prior Publication Data

US 2022/0337153 A1    Oct. 20, 2022

(30) Foreign Application Priority Data

Apr. 15, 2021    (KR) ........................ 10-2021-0049265

(51) Int. Cl.
*H02M 1/42*    (2007.01)
*H02M 1/00*    (2006.01)

(52) U.S. Cl.
CPC ....... *H02M 1/4233* (2013.01); *H02M 1/0045* (2021.05)

(58) Field of Classification Search
CPC ............. H02M 1/4233; H02M 1/0045; H02M 1/0043; H02M 1/10; H02M 1/36;
(Continued)

(56) References Cited

U.S. PATENT DOCUMENTS 9,493,080 B2    11/2016    Kvieska et al.
9,787,209 B2 *  10/2017    Dighrasker ............. H02M 5/42
(Continued)

FOREIGN PATENT DOCUMENTS

| CN | 109842287 | * | 6/2019 | ............. H02M 1/15 |
| CN | 109842287 A | | 6/2019 | |
| WO | 2021-023398 A1 | | 2/2021 | |

OTHER PUBLICATIONS

Attached translated foreign patent CN109842287. (Year: 2019).*
(Continued)

*Primary Examiner* — Emily P Pham
(74) *Attorney, Agent, or Firm* — MORGAN, LEWIS & BOCKIUS LLP

(57) ABSTRACT

A charging device may include a Power Factor Correction (PFC) circuit including first to third inductors connected to each of first to third input terminals, and first to third switch legs connected to each of the first to third inductors; and a relay network including a plurality of relays. When the first input terminal, the second input terminal and the third input terminal are connected to each phase of three-phase powers, the relay network connects each phase of the three-phase powers to the corresponding one among the first switch leg, the second switch leg, and the third switch leg, and the PFC circuit is operated as a three-phase boost PFC, when a single-phase power is connected to one among the first input terminal, the second input terminal and the third input terminal, the relay network connects the single-phase power to the first and second switch leg, connects the third switch leg to the neutral point, and the PFC circuit is operated as an interleaved single-phase full-bridge PFC of single inductor type.

18 Claims, 10 Drawing Sheets

(58) Field of Classification Search
CPC .... H02M 1/4216; H02M 1/4225; H02M 3/01;
H02M 7/219; H02M 1/007; H02M 1/32;
H02M 3/285; H02M 3/33576; Y02T
10/70; Y02T 10/7072; Y02T 90/14; B60L
53/20; B60L 53/24; B60L 2210/14; B60Y
2200/91
See application file for complete search history.

(56) References Cited

U.S. PATENT DOCUMENTS

| | | | |
|---|---|---|---|
| 2010/0080022 A1 | 4/2010 | Schmidt | |
| 2011/0149622 A1 | 6/2011 | Lin | |
| 2020/0083727 A1* | 3/2020 | Sun | H02M 7/797 |
| 2020/0313441 A1 | 10/2020 | Yang et al. | |

OTHER PUBLICATIONS

Extended European Search Report issued in corresponding European Application No. 21207877.8 dated Apr. 22, 2022.

Jackson D. K. et al., "A Power Factor Corrector with Bidirectional Power Transfer Capability", 2000 IEEE 31st Annual Power Electronics Specialists Conference, Conference Proceedings, Galway, Ireland, Jun. 18-23, 2000, pp. 365-370.

Haoyi Ye, et al., "Common Mode Noise Modeling and Analysis of Dual Boost PFC Circuit", IEEE, vol. 31-2, pp. 575-582.

* cited by examiner

CHARGING DEVICE

CROSS-REFERENCE TO RELATED APPLICATION

The present application claims priority to Korean Patent Application No. 10-2021-0049265 filed on Apr. 15, 2021, the entire contents of which is incorporated herein for all purposes by this reference.

BACKGROUND OF THE INVENTION

Field of the Invention

The present invention relates to a charging device.

Description of Related Art

Charging of a high voltage battery is essential for driving an electric vehicle. A charger mounted inside the vehicle may convert power input from commercial AC power into the voltage required by the battery. This is called an On Board Charger (OBC).

The OBC may include a power factor correction (PFC) circuit that corrects a power factor (PF) and a DC-DC converter that converts the voltage to the voltage required by the battery. The PFC circuit may receive a wide range of AC commercial AC power input. The DC-DC converter of the OBC may be implemented as a boost converter without a transformer. However, there is a problem that the charging operation is possible only when the output voltage is higher than the input voltage due to the characteristics of the boost converter.

Alternatively, the OBC may be implemented by combining the PFC implemented as a buck and the boost converter. This OBC converts the input voltage of a wide range of to supply a wide range of the output voltage, but the boost converter is directly connected to the battery, so a high output current ripple is applied to the battery, and the operating point is different because the motor output and OBC output are different, there is a limit that the charging efficiency is low.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a charging device configured for performing a charging operation with high charging efficiency in accordance with a wide range of input power and a wide battery charging voltage range.

The charging device according to various exemplary embodiments of the present invention may include a Power Factor Correction (PFC) circuit including a first inductor, a second inductor and a third inductor connected to each of a first input terminal, a second input terminal and a third input terminal, and a first switch leg, a second switch leg and a third switch leg connected to each of the first inductor, the second inductor and the third inductor; and a relay network including a plurality of relays. When the first input terminal, the second input terminal and the third input terminal are connected to each phase of three-phase power, the relay network may connect each phase of the three-phase power to the corresponding one among the first switch leg, the second switch leg, and the third switch leg, and the PFC circuit may be operated as a three-phase boost PFC, when a single-phase power is connected to one among the first input terminal, the second input terminal and the third input terminal, the relay network may connect the single-phase power to the first switch leg and the second switch leg, and connect the third switch leg to the neutral point, and the PFC circuit may be operated as an interleaved single-phase full-bridge PFC of a single inductor type.

The relay network may include: a first relay including one terminal connected to the first input terminal and the first inductor and the other terminal connected to the second input terminal and the second inductor; a second relay connected between the second input terminal and the second inductor; a third relay connected between the third input terminal and the third inductor; a fourth relay connected between the neutral point and the third inductor; and a fifth relay connected to the third inductor in parallel.

When the first input terminal, the second input terminal and the third input terminal is connected to each phase of the three-phase power, the first relay, the fourth relay, and the fifth relay may be turned off, and the second relay and the third relay may be turned on.

When a single-phase power is connected to the first input terminal, the first relay, the fourth relay, and the fifth relay may be turned on, and the second relay and the third relay may be turned off.

The charging device may further include a power conversion circuit connected between the PFC circuit and a battery and transmitting power from the battery to the PFC circuit.

The first switch leg may include a first switch connected between the first inductor and the first input terminal of the power conversion circuit and a second switch connected between the first inductor and the second input terminal of the power conversion circuit, the second switch leg may include a third switch connected between the second inductor and the first input terminal of the power conversion circuit and a fourth switch connected between the second inductor and the second input terminal of the power conversion circuit, and the third switch leg may include a fifth switch connected between the third inductor and the first input terminal of the power conversion circuit and a sixth switch connected between the third inductor and the second input terminal of the power conversion circuit.

When a single-phase power is connected to the first input terminal, the first relay, the fourth relay, and the fifth relay may be turned on, and the second relay and the third relay may be turned off. During a period in which the single-phase power is a positive voltage, a period in which the first switch, the third switch, and the sixth switch are in an ON state and a period in which the second switch, the fourth switch, and the sixth switch are in the ON state may be repeated, During a period in which the single-phase power is a negative voltage, a period in which the second switch, the fourth switch, and the fifth switch are in the ON state and a period in which the first switch, the third switch, and the fifth switch are in the ON state may be repeated.

The relay network may further include a sixth relay connected in parallel to a resistor connected between the first input terminal and the first inductor, and the charging device may turn on the sixth relay after the peak of the voltage input to the PFC circuit.

The charging device may further include a relay control circuit connected to the first input terminal, the second input terminal and the third input terminal to detect an input terminal to which a power is connected among the first input terminal, the second input terminal and the third input terminal and controlling the relay network.

A charging device according to another characteristic includes a Power Factor Correction (PFC) circuit including a first inductor, a second inductor and a third inductor connected to a first input terminal, a second input terminal and a third input terminal, respectively, and a first switch leg, a second switch leg and a third switch leg connected to the first inductor, the second inductor and the third inductor, respectively; and a relay network including a plurality of relays. When the first input terminal, the second input terminal and the third input terminal are connected to each of three-phase loads, the relay network may connect each phase of the three-phase powers to corresponding one among the first switch leg, the second switch leg, and the third switch leg, the PFC circuit may be operated as a three-phase inverter, and when a single-phase load is connected to one among the first input terminal, the second input terminal and the third input terminal, the relay network may connect the single-phase load to the first switch leg and the second switch legs, and connect the third switch leg to the neutral point, the PFC circuit may be operated as a single-phase inverter.

The relay network may include a first relay including one terminal connected to the first input terminal and the first inductor and the other terminal connected to the second input terminal and the second inductor; a second relay connected between the second input terminal and the second inductor; a third relay connected between the third input terminal and the third inductor; a fourth relay connected between the neutral point and the third inductor; and a fifth relay connected in parallel to the third inductor.

When the first input terminal, the second input terminal and the third input terminal are connected to each phase of the three-phase load, the first relay, the fourth relay, and the fifth relay may be turned off, and the second relay and the third relay may be turned on.

When the single-phase load is connected to the first input terminal, the first relay, the fourth relay, and the fifth relay may be turned on, and the second relay and the third relay may be turned off.

The charging device may further include a relay control circuit connected to the first input terminal, the second input terminal and the third input terminal to detect an input terminal to which a load is connected among the first input terminal, the second input terminal and the third input terminal, and controlling the relay network.

The charging device may further include a power conversion circuit connected between the PFC circuit and a battery and transmitting power from the battery to the PFC circuit.

The first switch leg may include a first switch connected between the first inductor and the first input terminal of the power conversion circuit and a second switch connected between the first inductor and the second input terminal of the power conversion circuit, the second switch leg may include a third switch connected between the second inductor and the first input terminal of the power conversion circuit and a fourth switch connected between the second inductor and the second input terminal of the power conversion circuit, and the third switch leg may include a fifth switch connected between the third inductor and the first input terminal of the power conversion circuit and a sixth switch connected between the third inductor and the second input terminal of the power conversion circuit.

When the single-phase load is connected to the first input terminal, the first relay, the fourth relay, and the fifth relay may be turned on, and the second relay and the third relay may be turned off. The first switch and the second switch may be switched alternately, the third switch and the fourth switch may be switched alternately, the on period of the first switch overlaps the whole on period of the fourth switch, and the on period of the third switch may overlap the entire on period of the second switch, and the fifth switch may be in the OFF state, and the sixth switch may be in the ON state.

The present invention may provide the charging device configured for operating the charging operation with high charging efficiency in accordance with the wide range of the input power and the wide range of the battery charging voltage range, and having the simpler circuit structure than before.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
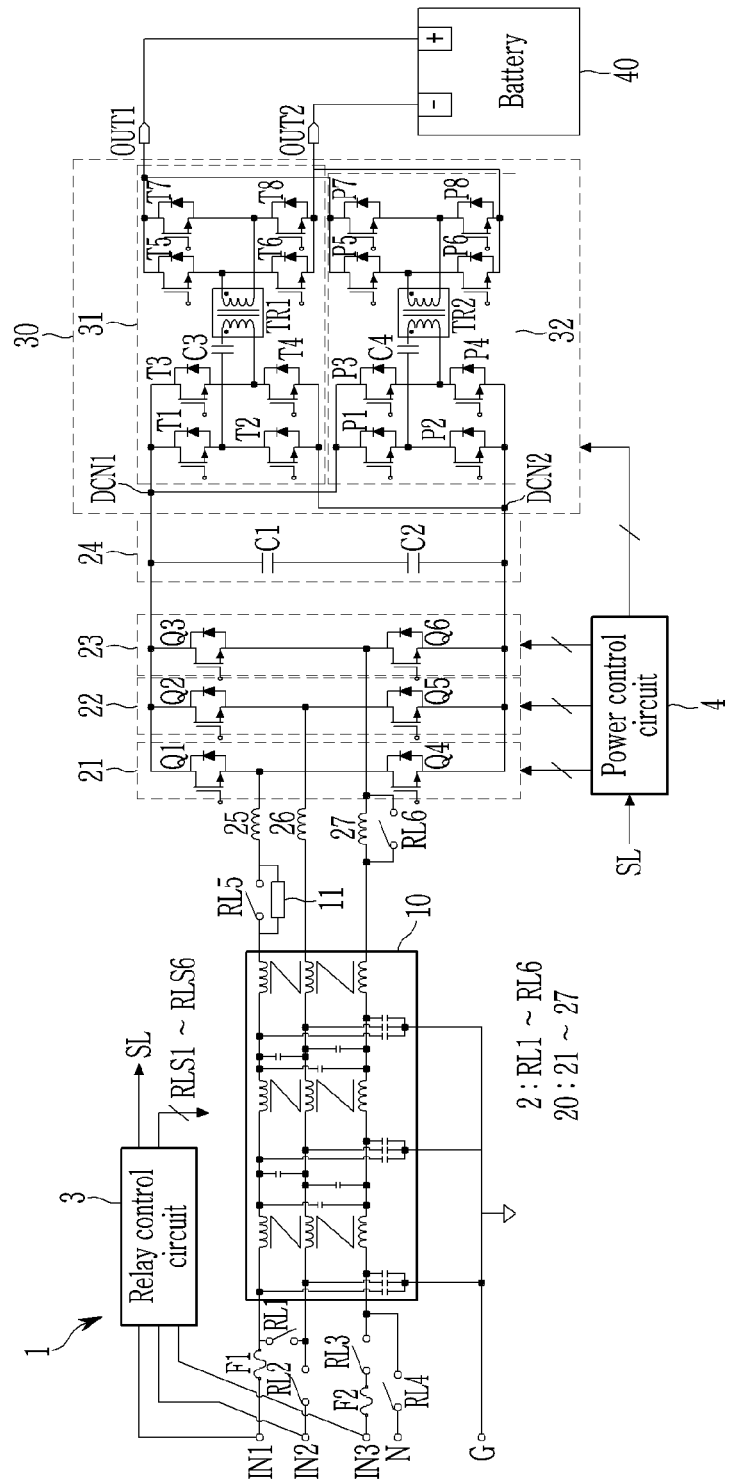
FIG. 1 is a view showing a charging device according to an exemplary embodiment of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments disclosed in the exemplary embodiment will be described in detail with reference to the accompanying drawings. In the exemplary embodiment, the same or similar constituent elements will be denoted by the same or similar reference numerals, and an overlapped description thereof will be omitted. The terms "module" and "unit" for components used in the following description are used only to easily make a specification. Therefore, these terms do not have meanings or roles that distinguish then from each other in themselves. Furthermore, in describing exemplary embodiments of the exemplary embodiment, when it is determined that a detailed description of the well-known art associated with the present invention may obscure the gist of the present invention, it will be omitted. Furthermore, the accompanying drawings are provided only to allow exemplary embodiments disclosed in the exemplary embodiment to be easily understood and are not to be interpreted as limiting the spirit disclosed in the exemplary embodiment, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to another component or may be connected or coupled to another component with the other component intervening therebetween. On the other hand, it is to be understood that when one component is referred to as being "connected or coupled directly" to another component, it may be connected to or coupled to another component without another component intervening therebetween.

It will be further understood that terms "comprise" or "have" used in the exemplary embodiment specify the presence of stated features, numerals, steps, operations, components, parts, or a combination thereof, but do not preclude the presence or addition of one or more other features, numerals, steps, operations, components, parts, or a combination thereof.

FIG. 1 is a view showing a charging device according to an exemplary embodiment of the present invention.

A charging device 1 includes a relay network 2, a relay control circuit 3, power control circuit 4, AC input filter 10, PFC circuit 20, and a power conversion circuit 30. The charging device 1 may convert the AC commercial power to generate the charging power for charging the battery 40. For example, the positive terminal (+) of the battery 40 may be connected to the output terminal OUT1, and the negative terminal (−) of the battery 40 may be connected to the output terminal OUT2.

The relay network 2 may control the on/off of a plurality of relays RL1-RL6 according to the phase of the AC commercial power, controlling the connection relationship between the PFC circuit 20 and the AC commercial power.

The relay network 2 includes a plurality of relays RL1 to RL6, and the relay control circuit 3 is connected to a plurality of input terminals IN1 to IN3 that are connected to the AC commercial power to detect a phase of the AC commercial power, controlling a plurality of relays RL1 to RL6 depending on the detected phase. The relay control circuit 3 may generate a plurality of relay control signals RLS1 to RLS6 for controlling the on/off of a plurality of relays RL1 to RL6 according to the detected phase to be supplied to a plurality of relays RL1 to RL6. A plurality of relays RL1 to RL6 are turned on (closed) or off (opened) according to a plurality of relay control signals RLS1 to RLS6.

For example, when the AC commercial power is the three-phase power, the relay control circuit 3 generates the relay control signals RLS2 and RLS3 that turn on a plurality of relays RL2 and RL3 and the relay control signals RLS1, RLS4, and RLS6 that turn off a plurality of relays RL1, RL4, and RL6 to be supplied to a plurality of relays RL1 to RL6. In the instant case, the relay control circuit 3 may generate a phase detection signal SL indicating three phases together and transmit it to the power control circuit 4.

Alternatively, when the AC commercial power is the single-phase, the relay control circuit 3 may generate the relay control signals RLS1, RLS4, and RLS6 that turn on a plurality of relays RL1, RL4, and RL6 and the relay control signals RLS2 and RLS3 that turn off a plurality of relays RL2 and RL3 to be supplied to a plurality of relays RL1 to RL6. In the instant case, the relay control circuit 3 may generate a phase detection signal SL indicating the single-phase together and transmit it to the power control circuit 4.

The relay control circuit 3 may generate a relay control signal RLS5 that turns on the relay RL5 when a predetermined time period elapses from the time when the charging operation starts, regardless of the single-phase or the three-phase, and supply it to the relay RL5.

One terminal of the relay RL1 is connected to one terminal of the inductor 25 and the input terminal IN1, and the other terminal of the relay RL1 is connected between the input terminal IN2 and one terminal of the inductor 26. The relay RL2 is connected to the input terminal IN2 and one terminal of the inductor 26, the relay RL3 is connected to the input terminal IN3 and one terminal of the inductor 27, and the relay RL4 is connected between a neutral point N and one terminal of the inductor 27. The relay RL5 is connected between the input terminal IN1 and one terminal of the inductor 25, and the relay RL6 is connected to the inductor 27 in parallel. A plurality of relays RL1 to RL6 may be implemented as electronic relays or mechanical relays.

The AC input filter 10 removes an electromagnetic interference (EMI) caused by the AC commercial power supplied through a plurality of input terminals IN1 to IN3. The AC input filter 10 includes a plurality of inductors provided on the input line between each input terminal and the PFC circuit 20 and a plurality of capacitors connected to the input line, and a plurality of capacitors are connected to an Y-CAP structure for each input line. However, this is an example of an AC input filter, and the present invention is not limited thereto, and the AC input filter which may be implemented in various known circuits may be applied.

The fuse F1 is connected between the input terminal IN1 and the inductor 25, and the fuse F2 is connected between the input terminal IN3 and the inductor 27.

The PFC circuit 20 includes three switch legs 21-23, three inductors 25-27, and a PFC link capacitor 24. The PFC circuit 20 may be operated according to a switch control signal supplied from the power control circuit 4. The power control circuit 4 may control the switching operation of the PFC circuit 20 according to the case where the AC commercial power is the single-phase or the three-phase according to the phase detection signal SL.

When the AC commercial power is the three-phase, the PFC circuit 20 receives a three-phase line-to-line voltage and is operated as a three-leg boost PFC. When the AC commercial power is the single-phase input, the PFC circuit 20 receives the voltage between the input terminal IN1 and the neutral point N and is operated with a PFC of an interleaved single-phase full-bridge structure of a single inductor type. That is, in the case of the three-phase, the PFC circuit 20 utilizes each input of the three input terminals IN1, IN2, and IN3 as power, and in the case of the single-phase, it utilizes the voltage between the input terminal IN1 and the neutral point N as power. In the case of the single-phase, the relay RL1 is turned on and all three first to third switch legs 21 to 23 are used for power transmission, the dual switch leg 23 is disconnected from the neutral point N, and the inductor 27 is deactivated by the turn-on of the relay RL6

Thus, the PFC circuit 20 is converted into the single inductor structure between the input terminal IN1 and the neutral point N, and the PFC circuit 20 has the interleaved single-phase full-bridge structure. In the instant case, the PFC circuit 20 may be operated as a unipolar totem pole control.

The PFC link capacitor 24 includes two capacitors C1 and C2 and charges the current transmitted according to each operation of three switch legs 21 to 23 to generate the DC voltage.

The power conversion circuit 30 converts the voltage charged in the PFC link capacitor 24 to generate and supply the DC voltage suitable for the load. Two input terminals DCN1 and DCN2 of the power conversion circuit 30 are connected to both terminals of the PFC link capacitor 24. Although the load is not shown in FIG. 1, a battery may be an example of a load, and the battery may be charged by being connected between two output terminals OUT1 and OUT2.

The power conversion circuit 30 includes two DC-DC converters connected between two input terminals DCN1 and DCN2 and two output terminals OUT1 and OUT2 in parallel. The structure in which two DC-DC converters are connected in parallel is an example according to various exemplary embodiments of the present invention, and the present invention is not limited thereto, and the power conversion circuit 30 may be implemented with an appropriate number of the DC-DC converters according to the size of the load.

The DC-DC converter 31 includes four switching elements T1 to T4 connected to one side by the full-bridge, four switching elements T5 to T8 connected to the other side by the full-bridge, an insulator transformer TR1 between one side and the other side, and a capacitor C3.

The DC-DC converter 32 includes four switching elements P1 to P4 connected to one side by the full-bridge, four switching elements P5 to P8 connected to the other side by the full-bridge, an insulator transformer TR2 between one side and the other side, and a capacitor C4.

The power control circuit 4 may control a power conversion operation of the DC-DC converter 31 and the DC-DC converter 32. For example, the power control circuit 4 may receive the output voltage supplied to the battery 40 as a feedback and generate a control signal to control the switching frequency or the duty ratio of the DC-DC converter 31 and the DC-DC converter 32 to be supplied to the DC-DC converter 31 and the DC-DC converter 32. Since the detailed control method is the same as the control method of the converter of an LLC resonance full-bridge structure, the detailed description is omitted.

In FIG. 1, the DC-DC converters 31, and 32 are implemented as the LLC resonance full-bridge, but the present invention is not limited thereto and may be implemented in other types. The operation of DC-DC converter is self-evident to a person of ordinary skill in the art to which various exemplary embodiments of the present invention belongs, and detailed description is omitted.

Figure 2:
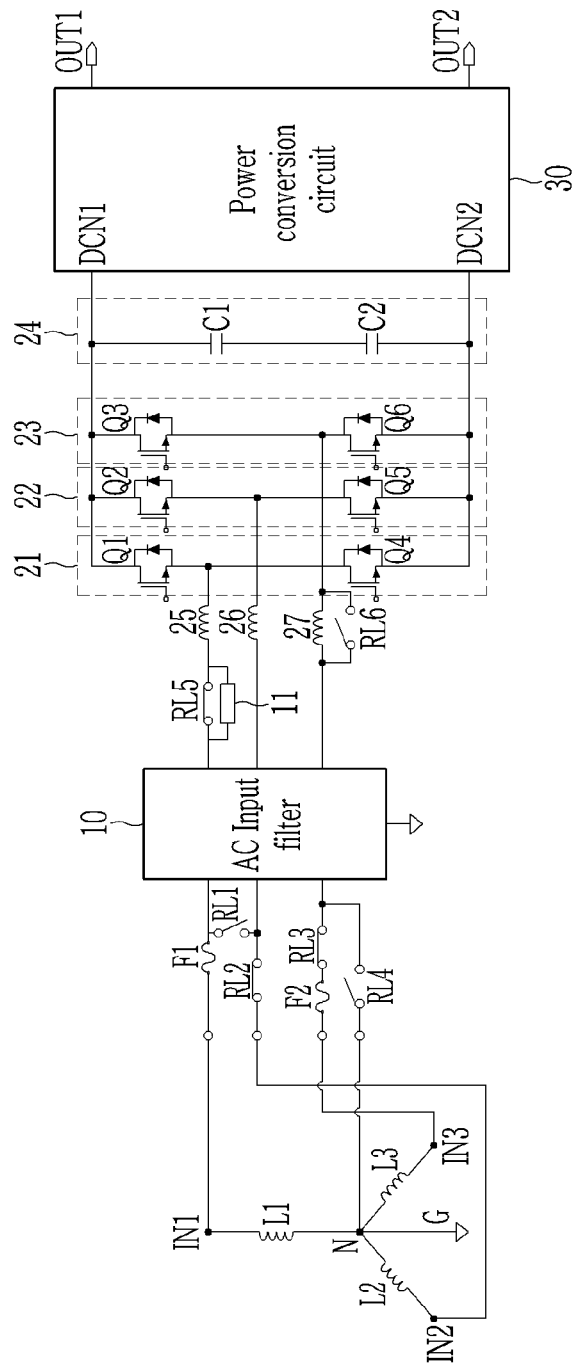
FIG. 2 is a circuit diagram to explain an operation when AC commercial power is three-phase.

FIG. 2 is a circuit diagram to explain an operation when an AC commercial power is a three-phase.

As shown in FIG. 2, the three-phase power is transmitted to each of three input terminals IN1, IN2, and IN3 through three inductors L1, L2, and L3.

The relay control circuit 3 detects that the AC commercial power is the three-phase, turns on the relays RL2 and RL3, turns off the relays RL1, RL4, and RL6, and turns on the relay RL5 after a peak of the voltage input to the PFC circuit 20. The relay RL5 is a relay for protecting devices such as the PFC link capacitor 24 when an inrush current flows by a high voltage of the input terminal. Until the voltage input of the PFC circuit 20 reaches the peak, the relay RL5 is in an OFF state and the input from the input terminal IN1 is supplied to the PFC circuit 20 through a resistor 11. After reaching the peak, the relay RL5 is turned on and the input from the input terminal IN1 is supplied to the PFC circuit 20 through the relay RL5 instead of through the resistor 11. The relay RL5 is in the OFF state until the voltage input of the PFC circuit 20 reaches the peak regardless of the single-phase or three-phase, and then is turned on after the peak.

When AC commercial power is three-phase, each input terminal IN1, IN2, and IN3 is connected to each inductor 25, 26, and 27, and the PFC circuit 20 operates as a three-leg boost PFC. The current flowing to each inductor 25, 26, and 27 is transmitted to the PFC link capacitor 25 according to the switching operation of each of the first to third switch legs 21, 22, and 23. For example, the input terminal IN1 is connected to the inductor 25, and the inductor 25 and the first switch leg 21 are operated as the boost PFC. The current flows into the inductor 25 by the voltage of the input terminal IN1, the current flowing into the inductor 25 during the on period of the switch Q1 is charged to the PFC link capacitor 25, and the current flows through the inductor L1 and the switch Q2 during the off period of the switch Q1 and the on period of the switch Q2.

Figure 3:
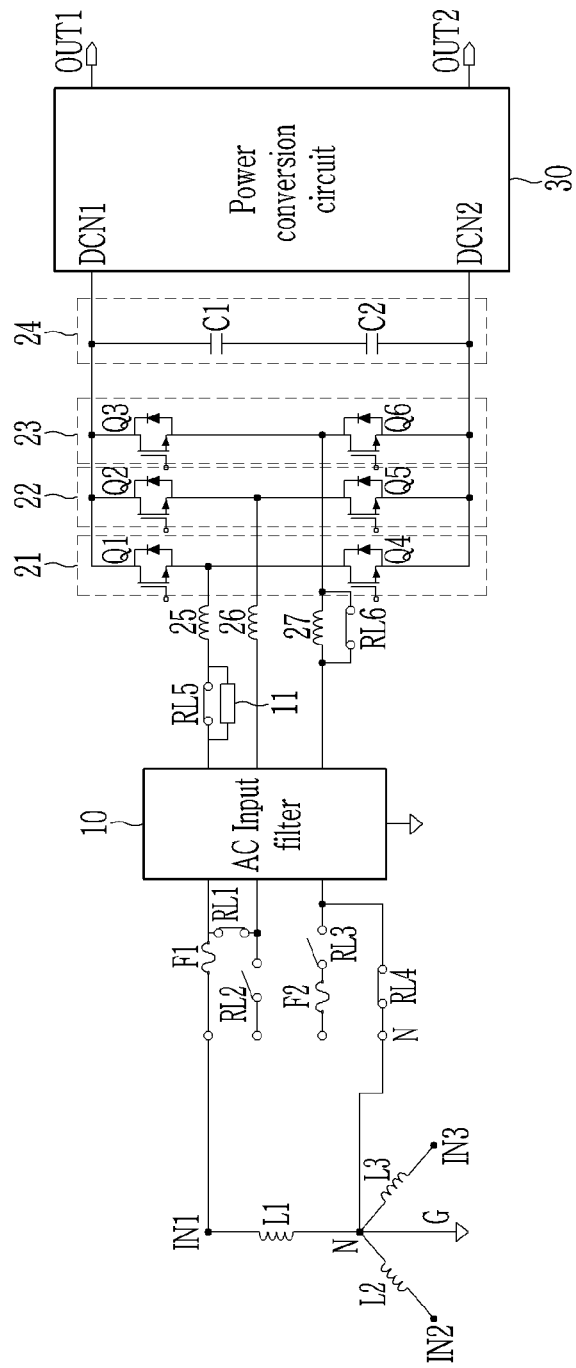
FIG. 3 is a circuit diagram to explain an operation when an AC commercial power is single-phase

FIG. 3 is a circuit diagram to explain an operation when an AC commercial power is a single-phase.

As shown in FIG. 3, the single-phase power is transmitted to the input terminal IN1 through the inductor L1.

The relay control circuit 3 detects that the AC commercial power is the single-phase, turns on the relays RL1, RL4, and RL6, turns off the relays RL2 and RL3, and turns on the relay RL5 after the peak of the voltage input to the PFC circuit 20.

The relay RL1 is turned on, and then the input terminal IN1 is connected to the first switch leg 21 and the second switch leg 22, the current flowing into the inductor L1 is branched to the first switch leg and the second switch legs 21 and 22, and the first switch leg and the second switch legs 21 and 22 are operated in an interleaved manner.

The relay RL4 turns on, the neutral point N and the third switch leg 23 are connected, the relay RL6 turns on, and the PFC circuit 20 performs the operation of the interleaved full-bridge PFC with a single-phase single inductor structure. That is, the relay RL1 is turned on and then the first to third switch legs 21 to 23 perform the power transmission.

The third switch leg 23 is connected to the neutral point N, and the inductor 27 is deactivated by the turn on of the relay RL6.

Figure 4A:
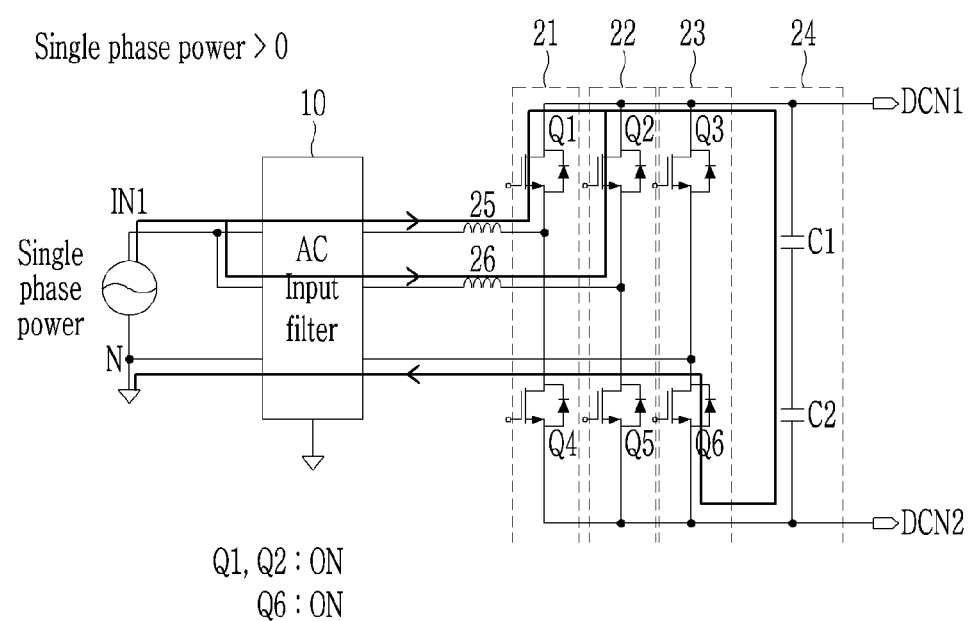
FIG. 4A, FIG. 4B, FIG. 4C and FIG. 4D are circuit diagrams to explain an operation of a PFC circuit when an input power according to an exemplary embodiment of the present invention is single-phase.
Figure 4B:
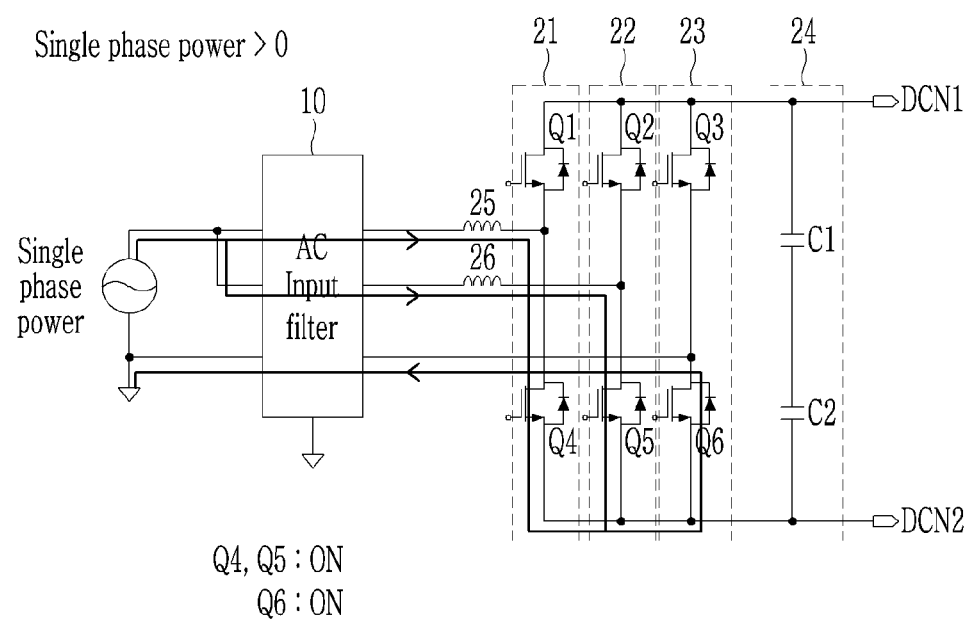
Figure 4C:
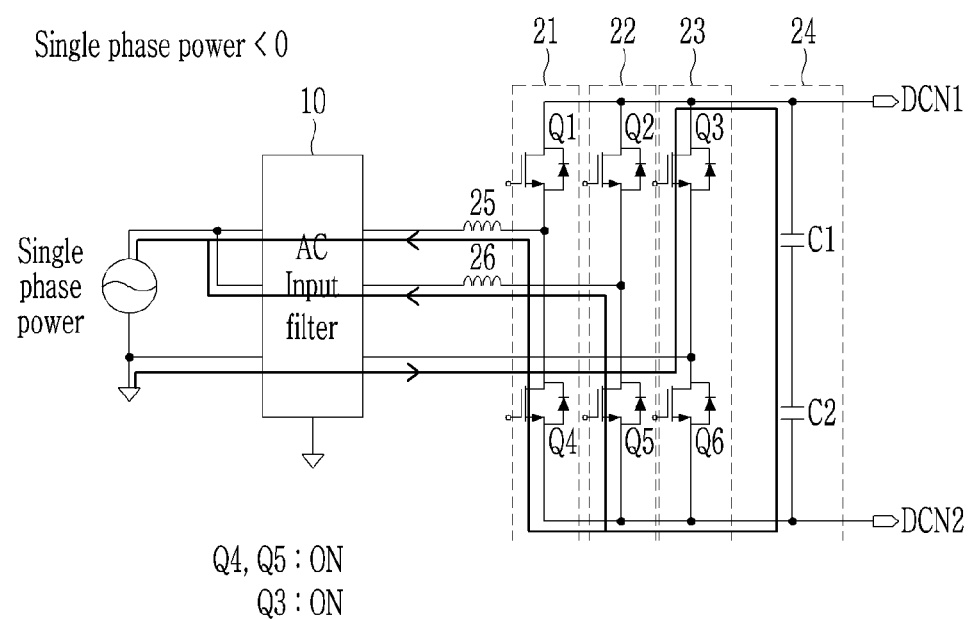
Figure 4D:
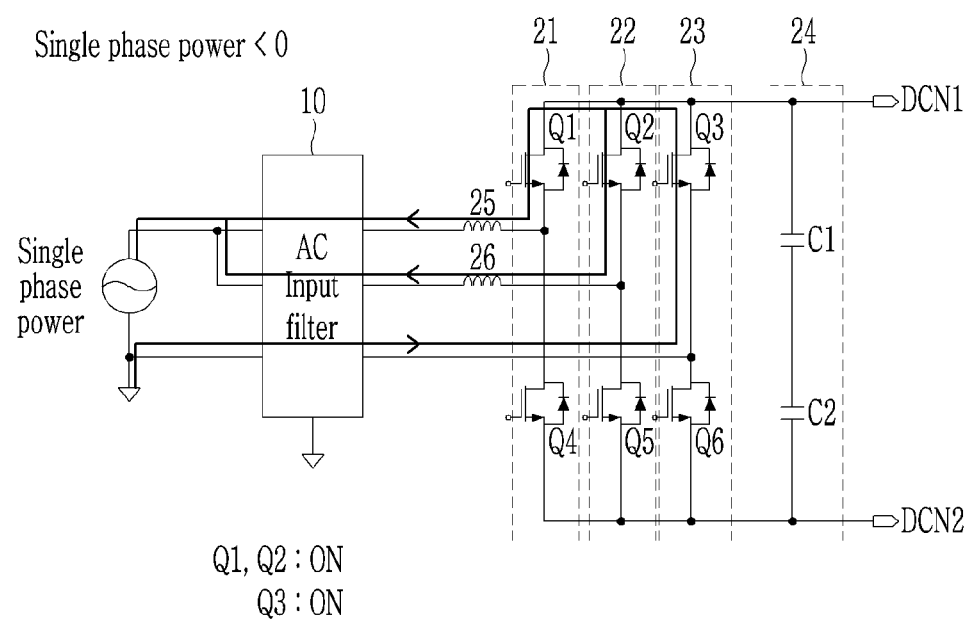

FIG. 4A FIG. 4D are circuit diagrams to explain an operation of a PFC circuit when an input power is a single-phase according to an exemplary embodiment of the present invention.

FIG. 4A and FIG. 4B are the views showing the current path depending on the operation of the first to third switch legs 21 to 23 when the single-phase power of a sine wave is the positive voltage. FIG. 4C and FIG. 4D are the views showing the current path depending on the operation of the first to third switch legs 21 to 23 when the single-phase power of a sine wave is the negative voltage. FIG. 4A and FIG. 4C are the views showing a power supply operation of the PFC circuit 20, and FIG. 4B and FIG. 4D are the views showing a power recovery operation of the PFC circuit 20. As shown in FIG. 4A, during the period when the switches Q1, Q2, and Q6 are in the ON state, and the current flows through the inductors 25 and 26, the switches Q1 and Q2, the capacitors C1 and C2, and the switch Q6 by the voltage of the single-phase power. During the present period, the power is supplied to the capacitors C1 and C2.

Subsequently, as shown in FIG. 4B, during the period when the switches Q4, Q5, and Q6 are in the ON state, the current flows through the inductors 25 and 26 and the switches Q4, Q5, and Q6 by the voltage of the single-phase power. During the present period, the power recovery operation in which the energy is stored in the inductors 25 and 26 is performed.

As shown in FIG. 4C, during the period in which the switches Q3, Q4, and Q5 are in the ON state, the current flows through the switch Q3, the capacitors C1 and C2, the switches Q4 and Q5, and the inductors 25 and 26 by the voltage of the single-phase power. During the present period, the power is supplied to the capacitors C1 and C2.

Next, as shown in FIG. 4D, during the period in which the switches Q1, Q2, and Q3 are in the ON state, the current flows through the inductors 25 and 26 and the switches Q1, Q2, and Q3 by the voltage of the single-phase power. During the present period, the power recovery operation in which the energy is stored in the inductors 25 and 26 is performed.

As the possible driving distance on a single charge of the electric vehicle is increasing, an increase in the battery capacity is required. Accordingly, an OBC (On Board Charger) is required to charge a large capacity, so it is necessary to increase the charging power.

A conventional charger has a two-stage structure of a PFC circuit and a DC/DC converter, and may be operated only under a single-phase input power condition. To implement the charging in the three-phase power input condition, the charger connected to each phase of the three-phase power may be connected in three-parallel. Accordingly, a circuit complexity increases, resulting in an increase in a material cost and a volume/weight. The charger including only the PFC circuit implemented with the boost converter has a simple circuit structure, but normal charging is impossible when the battery requirement voltage is lower than the input voltage. The buck-boost type of charger is configured for operating the charging for the entire period of the output voltage required by the battery, but the control is complicated and there is a section where the AC input voltage is low compared to the output voltage, so a power factor (PF) characteristic is unfavorable, and the boost converter is directly connected to the battery, so that a high output current ripple is applied to the battery, which adversely affects battery heat and lifespan.

The present invention relates to the charging device including the relay network that converts the PFC circuit into the charging system optimized according to the various AC power conditions, that is, the various power situations for each country. The present invention may provide the charging device configured for operating the charging operation with high charging efficiency in accordance with the wide range of the input power and the wide range of the battery charging voltage range, and having the simpler circuit structure than before.

In the case of a related art in which the OBC was designed for the three-phase input, it was difficult to generate and supply the sufficient charging power for the single-phase input. For example, for the single-phase input, the conventional OBC may supply only 3.6 kW of charging power. However, the charging device 1 according to various exemplary embodiments of the present invention may adjust the link voltage supplied to the power conversion circuit 30 by use of the PFC circuit 20 of the three-phase three-leg inverter type. Therefore, the charging device 1 may supply the sufficient charging power (e.g., 7.2 kW) to the battery 40 even for the single-phase input.

Furthermore, since the charging device 1 according to various exemplary embodiments of the present invention may adjust the link voltage, the number of a turn ratio, which is a ratio between the number of windings on one side of the transformers TR1 and TR2 and the number of windings on the other side, may be designed close to 1:1. Through this, the charging device 1 may supply the power to the three-phase load or the single connected to the input terminal of the charging device 1 from the battery 40 in a power supply direction (hereinafter, a forward direction) for charging the battery 40 and an opposite direction (hereinafter, a reverse direction).

Next, the operation that the charging device 1 supplies the power to the load from the battery 40 is described with reference to FIG. 5 to FIG. 7.

Figure 5:
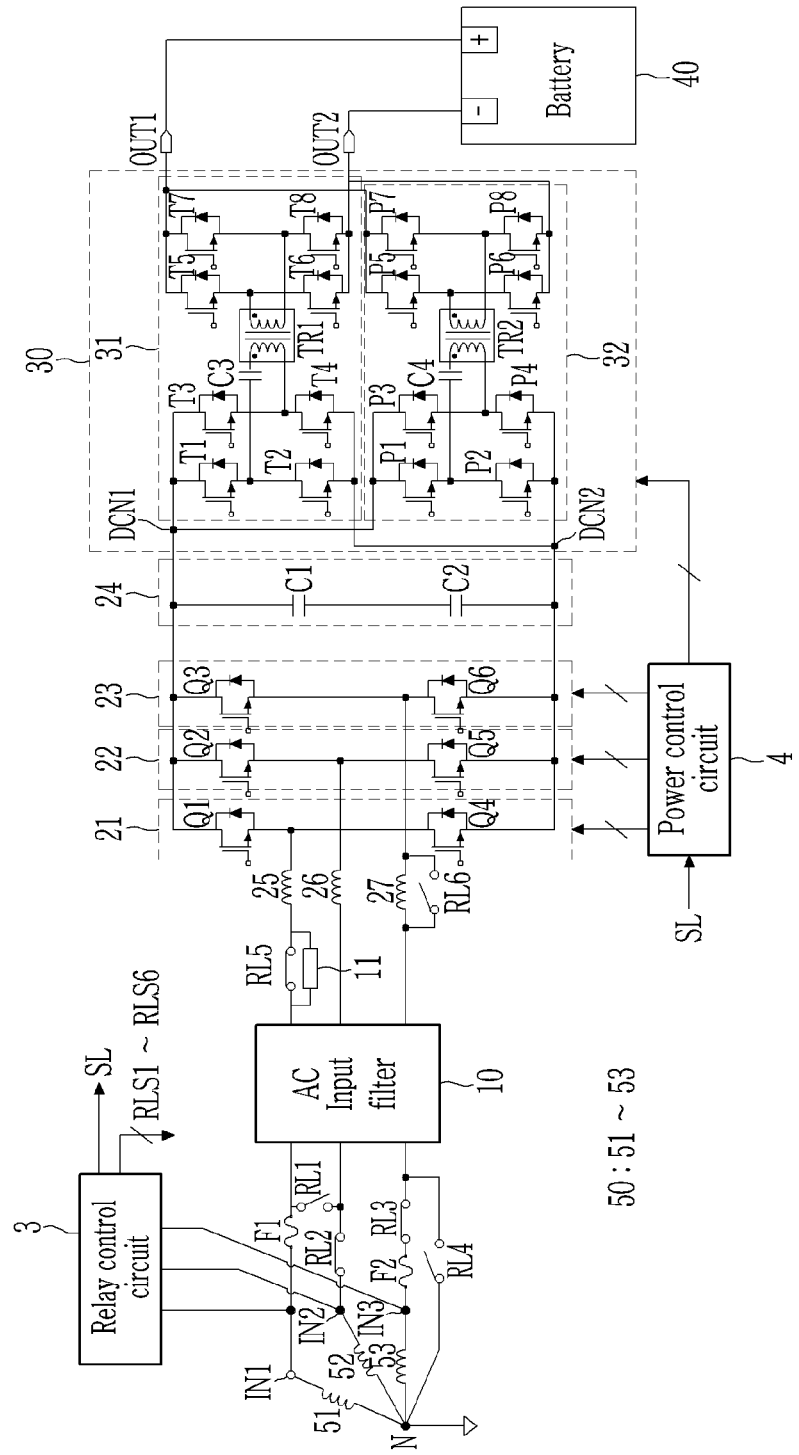
FIG. 5 is a view for explaining an operation when a charging device according to an exemplary embodiment supplies power to a three-phase load in a reverse direction thereof.

FIG. 5 is a view for explaining an operation when a charging device according to an exemplary embodiment supplies power to a three-phase load in a reverse direction thereof.

Each phase of the three-phase load 50 is shown as three inductors 51 to 53 in FIG. 5. The inductor 51 is connected between the input terminal IN1 and the neutral point N, the inductor 52 is connected between the input terminal IN2 and the neutral point N, and the inductor 53 is connected between the input terminal IN3 and the neutral point N. In FIG. 5, the three-phase load 50 is shown with three inductors 51-53, but the present invention is not limited thereto. Each load of the three-phase load 50 may be implemented as one of a resistor, an inductor, and a capacitor, or a combination of at least two thereof.

Compared with FIG. 1, the same reference numeral is indicated for the same configuration, and the overlapping descriptions are omitted below.

The relay control circuit 3 may detect the load connected to a plurality of input terminals IN1 to IN3 to determine whether it is the three-phase load or the single-phase load. When the load connected to a plurality of input terminals IN1 to IN3 is the three-phase load, the relay control circuit 3 may generate the relay control signals RLS2 and RLS3 for turning on a plurality of relays RL2 and RL3 and the relay control signals RLS1, RLS4, and RLS6 for turning off a plurality of relays RL1, RL4, and RL6 to be supplied to a plurality of relays RL1, RL4, and RL6. In the instant case, the relay control circuit 3 may generate the phase detection signal SL indicating the three-phase together and transmit it to the power control circuit 4. The relay control circuit 3 turns on the relay RL5 when a predetermined time period has elapsed from the timing that the charging operation of the reverse direction states.

The positive terminal (+) and the negative terminal (−) of the battery 40 are connected to two output terminals OUT1 and OUT2, and the power is supplied from the battery 40 to the power conversion circuit 30 through two output terminals OUT1 and OUT2. First, the operation of supplying the power from the battery 40 to the PFC circuit 20 through the power conversion circuit 30 is described. Only one of the DC-DC converter 31 and the DC-DC converter 32 may perform the power supply operation. For example, the operation that the DC-DC converter 31 supplies the power from the battery 40 to the PFC circuit 20 is described. In the instant case, the switches P5 to P8 of the DC-DC converter 32 may be replaced with a diode.

The voltage between the positive terminal (+) and the negative terminal (−) of battery 40 is supplied as the input voltage of the DC-DC converter 31. When the DC-DC converter 31 converts the input voltage to be supplied to the PFC circuit 20 in the reverse direction thereof, all switches T1 to T4 positioned on one side are turned off. According to the switching operation of the switches T5 to T8 positioned on the other side, a current path is formed through the body diode of the switches positioned on one side thereof.

For example, during the on period of the switches T5 and T8 and the off period of the switches T6 and T7, a resonance current flowing to the other side of the transformer TR1 flows through the switches T5 and T8, and the power is transferred to one side of the transformer TR1. At the instant time, the current flows through the body diode of the switches T1 and T4, and then the power is supplied to the PFC circuit 20. Subsequently, there is a dead time in which all switches T5 to T8 are in the OFF state. After the dead time, during the on period of the switches T6, and T7 and the off period of the switches T5 and T8, the resonant current flowing to the other side of the transformer TR1 flows through the switches T6 and T7, and the power is transmitted to one side of the transformer TR1. At the instant time, the current flows through the body diode of the switch T2 and the switch T3 and the power is supplied to the PFC circuit 20. Subsequently, there is a dead time in which all switches T5 to T8 are in the OFF state. The present operation is repeated and then the power is supplied from the battery 40 connected to the other side of the power conversion circuit 30 to the PFC circuit 20 connected to one side of the power conversion circuit 30.

The PFC link capacitor 24 may charge the energy supplied from the DC-DC converter 31 and smooth the voltage input to the PFC circuit 20. The PFC circuit 20 may supply the AC power to the three-phase load 50 according to the switching operation of the first to third switch legs 21 to 23. For example, the power control circuit 4 controls the PFC circuit 20 to operate as the three-phase inverter according to the phase detection signal SL. That is, the switching operation of the first to third switch legs 21 to 23 has a phase difference of 120 degrees, and the switching operation of two switches (e.g., Q1 and Q4) in each of the first to third switch legs 21 to 23 is complementary switching of a phase difference of 180 degrees. the operation of the three-phase inverter is a known technology, and detailed description is omitted.

Figure 6:
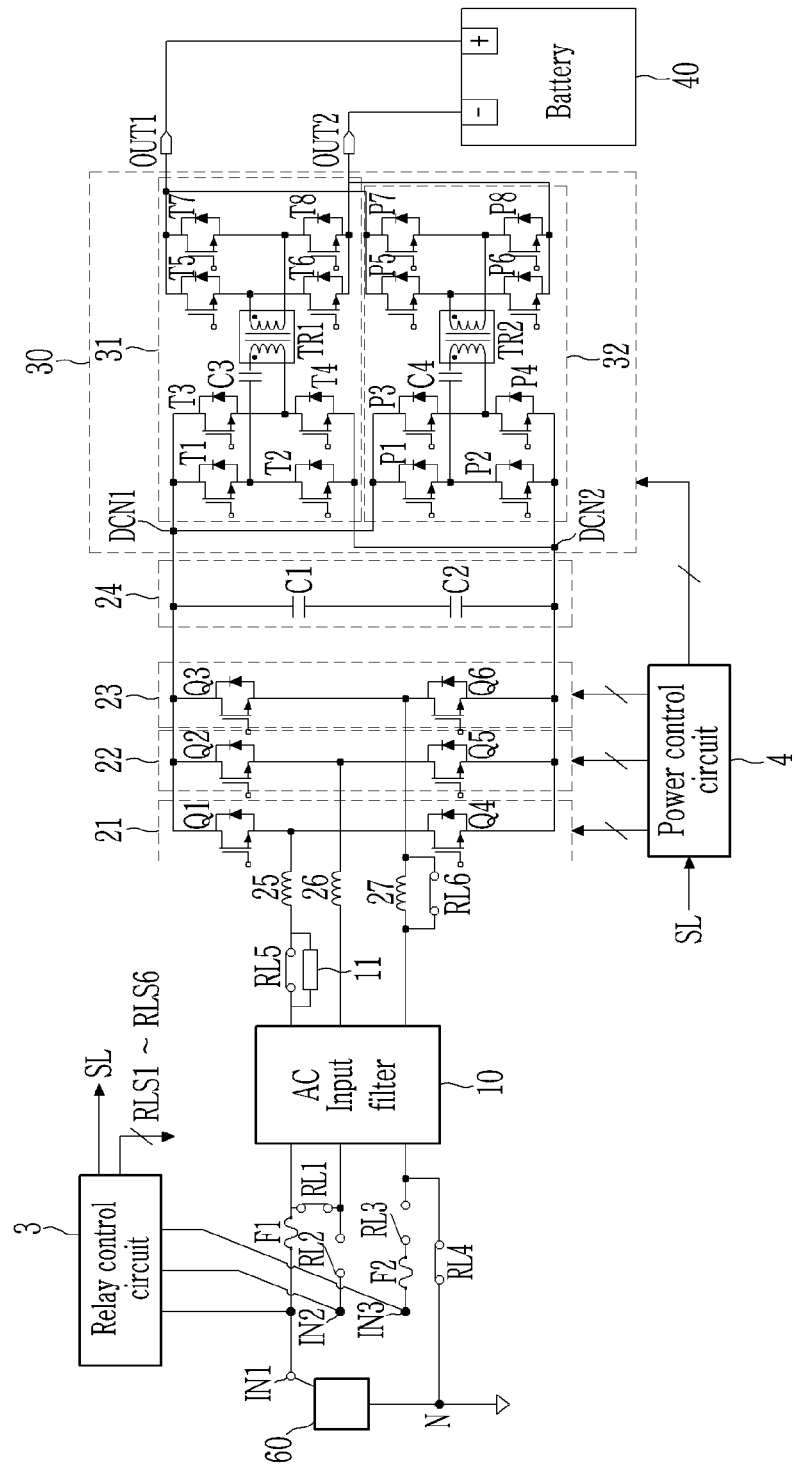
FIG. 6 is a view for explaining an operation when a charging device according to an exemplary embodiment supplies power to a single-phase load in a reverse direction thereof.

FIG. 6 is a view for explaining an operation when a charging device according to an exemplary embodiment supplies power to a single-phase load in a reverse direction thereof.

The single-phase load 60 may be implemented as one of a resistor, an inductor, and a capacitor, or a combination of at least two thereof. Compared with FIG. 1, the same reference numeral is indicated for the same configuration, and overlapping descriptions are omitted below.

The relay control circuit 3 may detect a load connected to a plurality of input terminals IN1 to IN3 to determine whether it is a three-phase load or a single-phase load. When the load connected to a plurality of input terminals IN1 to IN3 is the single-phase load, the relay control circuit 3 may generate the relay control signals RLS1, RLS4, and RLS6 for turning on a plurality of relays RL1, RL4, and RL6 and the relay control signals RLS2, and RLS3 for turning off a plurality of relays RL2 and RL3 to be supplied to a plurality of relays RL1 to RL6. In the instant case, the relay control circuit 3 may generate the phase detection signal SL indicating the single-phase together and transmit it to the power control circuit 4. The relay control circuit 3 turns on the relay RL5 when a predetermined time period has elapsed from the time that the charging operation of the reverse direction starts.

The method in which the power is supplied to the PFC circuit 20 through the power conversion circuit 30 is the same as the above-described exemplary embodiment in which the three-phase load is connected and the description thereof is omitted. Hereinafter, the operation of the PFC circuit 20 of the exemplary embodiment in which the single-phase load 60 is connected is described with reference to FIG. 7. As shown in FIG. 7, the PFC circuit 20 is operated as the single-phase inverter.

Figure 7:
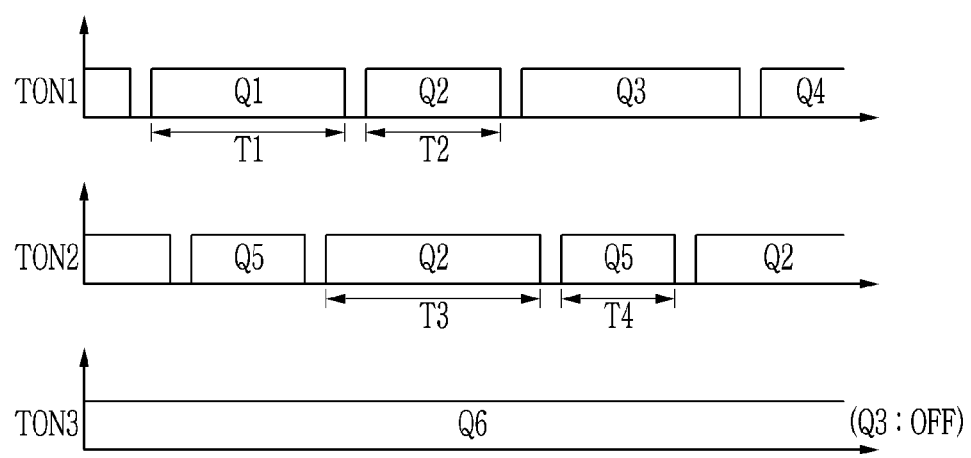
FIG. 7 is a view showing a switching operation of a PFC circuit according to an exemplary embodiment of the present invention.

FIG. 7 is a view showing a switching operation of a PFC circuit according to an exemplary embodiment of the present invention.

As shown in FIG. 7, the switch in the ON state among the switches Q1 and Q4 of the first switch leg 21 is shown in a "TON1" waveform diagram, the switch in the ON state among the switches Q2 and Q5 of the second switch leg 22 is shown in a "TON2" waveform diagram, and the switch in the ON state among the switches Q3 and Q6 of the third switch leg 23 is shown in a "TON3" waveform diagram. In the single-phase load condition, in the third switch leg 23, the switch Q3 is in the OFF state and the switch Q6 is in the ON state.

During the period T1 when the switch Q1 is in the ON state and the switch Q4 is in the OFF state in first switch leg 21, the current flows into the inductor 25 by the input voltage charged to the PFC link capacitor 24. The current of the inductor 25 flows through a load 60, a relay RL6, and a switch Q6, and the power is supplied to the load 60. Subsequently, during the period T2 when the switch Q1 is in the OFF state and the switch Q4 is in the ON state in the first switch leg 21, the current of the inductor 25 flows through the relay RL6, the switch Q6, and the switch Q4. Between the period T1 and the period T2, there is a dead time in which both switches Q1 and Q4 are in the OFF state.

During the period T3 in which the switch Q2 is in the ON state and the switch Q5 is in the OFF state in the second switch leg 22, the current flows to the inductor 26 by the input voltage charged in the PFC link capacitor 24. The current of the inductor 26 flows through the load 60, the relay RL6, and the switch Q6, and the power us supplied to the load 60. Next, during the period T4 that the switch Q4 is in the OFF state and the switch Q5 is in the ON state in the second switch leg 22, the current of the inductor 25 flows through the relay RL6, the switch Q6, and the switch Q5. Between the period T3 and the period T4, there is a dead time in which both switches Q2 and Q5 are in the OFF state.

The charging device 1 according to such various exemplary embodiments of the present invention may supply the power from the battery 40 to the load. The charging device 1 according to various exemplary embodiments of the present invention may be applied to the electric vehicle, and the battery 40 supplies the power required to operate the electric vehicle.

The charging is possible regardless of a rated voltage of the battery through the charging device according to an exemplary embodiment of the present invention. Furthermore, the charging device may supply the power from the battery to the load (Vehicle to Load, V2L) or from the battery to the system (Vehicle to Grid, V2G). Furthermore, since the frequency variable range of the charging device is narrow compared to the operating frequency range of the LLC converter, the transformer may be down-sized. In the PFC circuit according to various exemplary embodiments of the present invention, a current stress applied to the switch of the PFC circuit is constant regardless of a boosting ratio. Therefore, the charging device according to various exemplary embodiments of the present invention may implement a high boosting ratio.

In the implement of V2G, the link voltage variable method is applied to the charging device, so that the output voltage range which may be supplied to the system is very wide. Also, the resonant gain of the LLC converter does not change because the turn ratio is almost the same in the reverse direction power supply and the forward direction power supply. In the reverse direction power supply, the power supply of 380 V or higher is possible without providing a separate converter on the load side thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A charging device comprising:
a Power Factor Correction (PFC) circuit including a first inductor, a second inductor and a third inductor connected to each of a first input terminal, a second input terminal and a third input terminal, and a first switch leg, a second switch leg and a third switch leg connected to each of the first inductor, the second inductor and the third inductor; and
a relay network including a plurality of relays,
wherein when the first input terminal, the second input terminal and the third input terminal are connected to each phase of three-phase powers, the relay network connects each phase of the three-phase powers to the corresponding one among the first switch leg, the second switch leg, and the third switch leg, and the PFC circuit is operated as a three-phase boost PFC, and
when a single-phase power is connected to one among the first input terminal, the second input terminal and the third input terminal, the relay network connects the single-phase power to the first switch leg and the second switch leg, connects the third switch leg to a neutral point, and the PFC circuit is operated as an interleaved single-phase full-bridge PFC of a single inductor type.

2. The charging device of claim 1, wherein the relay network includes:
a first relay including one terminal connected to the first input terminal and the first inductor and the other terminal connected to the second input terminal and the second inductor;
a second relay connected between the second input terminal and the second inductor;
a third relay connected between the third input terminal and the third inductor;
a fourth relay connected between the neutral point and the third inductor; and
a fifth relay connected to the third inductor in parallel.

3. The charging device of claim 2, wherein
when the first input terminal, the second input terminal and the third input terminal are connected to each phase of the three-phase power,
the first relay, the fourth relay, and the fifth relay are turned off, and the second relay and the third relay are turned on.

4. The charging device of claim 2, wherein
when a single-phase power is connected to the first input terminal,
the first relay, the fourth relay, and the fifth relay are turned on, and the second relay and the third relay are turned off.

5. The charging device of claim 4, wherein
the relay network further includes a sixth relay connected in parallel to a resistor connected between the first input terminal and the first inductor, and
the charging device turns on the sixth relay after a peak of a voltage input to the PFC circuit.

6. The charging device of claim 2, further including:
a power conversion circuit connected between the PFC circuit and a battery and transmitting power from the battery to the PFC circuit.

7. The charging device of claim 6,
wherein the first switch leg includes a first switch connected between the first inductor and a first input terminal of the power conversion circuit and a second switch connected between the first inductor and a second input terminal of the power conversion circuit,
wherein the second switch leg includes a third switch connected between the second inductor and the first input terminal of the power conversion circuit and a fourth switch connected between the second inductor and the second input terminal of the power conversion circuit, and
wherein the third switch leg includes a fifth switch connected between the third inductor and the first input terminal of the power conversion circuit and a sixth switch connected between the third inductor and the second input terminal of the power conversion circuit.

8. The charging device of claim 7, wherein
when a single-phase power is connected to the first input terminal,
the first relay, the fourth relay, and the fifth relay are turned on, and the second relay and the third relay are turned off,
during a period in which the single-phase power is a positive voltage, a period in which the first switch, the third switch, and the sixth switch are in an ON state and a period in which the second switch, the fourth switch, and the sixth switch are in the ON state are repeated, and
during a period in which the single-phase power is a negative voltage, a period in which the second switch, the fourth switch, and the fifth switch are in the ON state and a period in which the first switch, the third switch, and the fifth switch are in the ON state are repeated.

9. The charging device of claim 2, wherein
the relay network further includes a sixth relay connected in parallel to a resistor connected between the first input terminal and the first inductor, and
the charging device turns on the sixth relay after a peak of a voltage input to the PFC circuit.

10. The charging device of claim 1, further including:
a relay control circuit connected to the first input terminal, the second input terminal and the third input terminal to detect an input terminal to which a power is connected among the first input terminal, the second input terminal and the third input terminal and controlling the relay network.

11. A charging device comprising:
a Power Factor Correction (PFC) circuit including a first inductor, a second inductor and a third inductor connected to a first input terminal, a second input terminal and a third input terminal, respectively, and a first switch leg, a second switch leg and a third switch leg connected to the first inductor, the second inductor and the third inductor, respectively; and
a relay network including a plurality of relays, and
when the first input terminal, the second input terminal and the third input terminal are connected to each of three-phase loads, the relay network connects each phase of the three-phase powers to a corresponding one among the first switch leg, the second switch leg, and the third switch leg, and the PFC circuit is operated as a three-phase inverter, and
when a single-phase load is connected to one among the first input terminal, the second input terminal and the third input terminal, the relay network connects the single-phase load to the first switch leg and the second switch legs, connects the third switch leg to a neutral point, and the PFC circuit is operated as a single-phase inverter.

12. The charging device of claim 11, wherein the relay network includes:
a first relay including one terminal connected to the first input terminal and the first inductor and the other terminal connected to the second input terminal and the second inductor;
a second relay connected between the second input terminal and the second inductor;
a third relay connected between the third input terminal and the third inductor;
a fourth relay connected between the neutral point and the third inductor; and
a fifth relay connected in parallel connected to the third inductor.

13. The charging device of claim 12, wherein
when the first input terminal, the second input terminal and the third input terminal are connected to each phase of the three-phase load,
the first relay, the fourth relay, and the fifth relay are turned off, and the second relay and the third relay are turned on.

14. The charging device of claim 12, wherein
when the single-phase load is connected to the first input terminal,
the first relay, the fourth relay, and the fifth relay are turned on, and the second relay and the third relay are turned off.

15. The charging device of claim 12, further including:
a relay control circuit connected to the first input terminal, the second input terminal and the third input terminal to detect an input terminal to which a load is connected among the first input terminal, the second input terminal and the third input terminal, and controlling the relay network.

16. The charging device of claim 12, further including:
a power conversion circuit connected between the PFC circuit and a battery and transmitting power from the battery to the PFC circuit.

17. The charging device of claim 16, wherein
the first switch leg includes a first switch connected between the first inductor and a first input terminal of the power conversion circuit and a second switch connected between the first inductor and a second input terminal of the power conversion circuit,
the second switch leg includes a third switch connected between the second inductor and the first input terminal of the power conversion circuit and a fourth switch connected between the second inductor and the second input terminal of the power conversion circuit, and
the third switch leg includes a fifth switch connected between the third inductor and the first input terminal of the power conversion circuit and a sixth switch connected between the third inductor and the second input terminal of the power conversion circuit.

18. The charging device of claim 17, wherein
when the single-phase load is connected to the first input terminal,
the first relay, the fourth relay, and the fifth relay are turned on, and the second relay and the third relay are turned off,
the first switch and the second switch are alternately switched, the third switch and the fourth switch are alternately switched, an ON period of the first switch overlaps an entire ON period of the fourth switch, and an ON period of the third switch overlaps an entire ON period of the second switch,
the fifth switch is in an OFF state, and the sixth switch is in an ON state.

* * * * *